US012447087B2

(12) United States Patent
Raymond

(10) Patent No.: US 12,447,087 B2
(45) Date of Patent: Oct. 21, 2025

(54) INFANT WARMER MATTRESS SUPPORT EXTENSION APPARATUS AND METHOD OF USE

(71) Applicant: Nuvance Health, Danbury, CT (US)

(72) Inventor: Christine Raymond, New Milford, CT (US)

(73) Assignee: NUVANCE HEALTH, Danbury, CT (US)

( * ) Notice: Subject to any disclaimer, the term of this patent is extended or adjusted under 35 U.S.C. 154(b) by 995 days.

(21) Appl. No.: 17/440,179

(22) PCT Filed: Mar. 24, 2020

(86) PCT No.: PCT/US2020/024466
§ 371 (c)(1),
(2) Date: Sep. 16, 2021

(87) PCT Pub. No.: WO2020/198228
PCT Pub. Date: Oct. 1, 2020

(65) Prior Publication Data

US 2022/0183911 A1 Jun. 16, 2022

Related U.S. Application Data

(60) Provisional application No. 62/831,899, filed on Apr. 10, 2019, provisional application No. 62/823,375, filed on Mar. 25, 2019.

(51) Int. Cl.
*A61G 11/00* (2006.01)
*A61G 7/10* (2006.01)

(52) U.S. Cl.
CPC .......... *A61G 11/005* (2013.01); *A61G 7/1046* (2013.01); *A61G 7/1057* (2013.01)

(58) Field of Classification Search
CPC .. A61G 11/005; A61G 7/1046; A61G 7/1057; A61G 11/00
(Continued)

(56) References Cited

U.S. PATENT DOCUMENTS 4,750,474 A * 6/1988 Dukhan ................ A61G 11/00
128/205.26
5,853,361 A 12/1998 Kobayashi et al.
(Continued)

FOREIGN PATENT DOCUMENTS

WO 2017-053406 A1 3/2017

OTHER PUBLICATIONS

International Search Report, PCT/US2020/024466, mailed Jun. 24, 2020, performed by ISA/US.

*Primary Examiner* — Sunita Reddy
(74) *Attorney, Agent, or Firm* — Wiggin and Dana LLP

(57) ABSTRACT

The present invention relates to an apparatus and method for providing safe and effective access for a newborn infant, i.e. a neonate, to a neonatal warming device while the umbilical cord is still intact. The apparatus comprises a stable support extension tray that enables movement of the mattress and the warmed surface of the warming device to allow for delayed cord clamping (DCC) of an umbilical cord attached to the infant and mother, while also providing full access to the life support features housed within the warming device, access for healthcare personnel to attend to the neonate, access for healthcare personnel to attend to the mother while maintaining sterile conditions for the mother in the case of a C-section (Caesarean section) delivery.

21 Claims, 13 Drawing Sheets

(58) Field of Classification Search
USPC .................................................... 600/21–22
See application file for complete search history.

(56) References Cited

U.S. PATENT DOCUMENTS

| | | | | |
|---|---|---|---|---|
| 6,155,970 | A | 12/2000 | Dykes et al. | |
| 2004/0236174 | A1* | 11/2004 | Boone .................. | A61B 5/7435 600/21 |
| 2010/0249492 | A1 | 9/2010 | Khodak | |
| 2010/0249493 | A1 | 9/2010 | Chilton | |
| 2011/0113555 | A1* | 5/2011 | Smith .................... | A61G 11/00 5/601 |
| 2013/0025062 | A1* | 1/2013 | Esch .................... | A47D 15/001 5/655 |
| 2013/0267765 | A1* | 10/2013 | Rapoport ............... | A61B 5/055 600/22 |
| 2014/0364722 | A1* | 12/2014 | Dumoulin .............. | A61B 5/055 600/415 |
| 2015/0005618 | A1* | 1/2015 | Dumoulin .............. | A61B 5/055 5/601 |
| 2015/0231012 | A1* | 8/2015 | Rapoport ............. | A61G 11/006 29/428 |
| 2016/0270993 | A1 | 9/2016 | Wilden et al. | |
| 2018/0177656 | A1 | 6/2018 | Giambattista et al. | |
| 2020/0268583 | A1* | 8/2020 | Sherman .............. | A61G 13/107 |
| 2021/0220200 | A1* | 7/2021 | Te Pas ................... | A61G 11/00 |

* cited by examiner

Workflow Pathways for C–Section and Vaginal Deliveries

Vaginal Delivery: DR Workflow

INFANT WARMER MATTRESS SUPPORT EXTENSION APPARATUS AND METHOD OF USE

CROSS-REFERENCES TO RELATED APPLICATIONS

This application is a national phase entry under 35 U.S.C. § 371 of International Application PCT/US2020/024466, filed Mar. 24, 2020, which claims priority to U.S. provisional application No. 62/823,375, filed on Mar. 25, 2019 and titled "Infant Warmer Mattress Support Extension Tray," and U.S. provisional application No. 62/831,899, filed on Apr. 10, 2019 and also titled "Infant Warmer Mattress Support Extension Tray," the contents of each of which are incorporated herein by reference in their entireties.

FIELD OF THE INVENTION

The present invention relates to an apparatus and method for providing safe and effective access to a newborn infant, i.e. a neonate, that is positioned under a neonatal warming device and while the umbilical cord is still intact to both the mother's placenta and the infant. The apparatus comprises a stable support extension tray that enables movement of an associated mattress and any blankets, and the warmed surface of the warming device to allow for delayed cord clamping (DCC) of an umbilical cord attached to the infant and mother, while also providing full access to the life support features housed within the warming device, access for healthcare personnel to attend to the neonate, and access for healthcare personnel to attend to the mother while maintaining sterile conditions for the mother in the case of a C-section (Caesarean section) delivery. The apparatus allows for keeping the umbilical cord intact for a medically optimal amount of time while also allowing the neonate to receive all of the life support benefits of the neonatal warmer, including 1) warming, 2) oxygen support, 3) ventilatory support, etc. Current neonatal warming devices are designed in such a way that delayed cord clamping and the optimal use of a neonatal warmer cannot both be achieved simultaneously. This conflict results in cord clamping occurring much sooner than is currently medically advised (even in healthy newborns); thereby denying the newborn proper medical care and possibly exposing the neonate to both near- and long-term negative medical consequences. The present invention allows for both delayed cord clamping and the optimal use of a neonatal warmer to be synchronously achieved, thereby providing healthcare personnel the ability to deliver the highest standard of care now recommended.

BACKGROUND OF THE INVENTION

Evidence supporting the benefits of delayed cord clamping (30-60 seconds) is newly well established. Similarly, evidence of the dangers and negative consequences, for a newborn, of early cord clamping (<30 seconds) is also more recently well established. In order to accommodate delayed cord clamping for all newborns, The American College of Obstetricians and Gynecologists/Neonatal Resuscitation Program (ACOG/NRP) identified the feasibility of ventilatory resuscitation with an intact cord an important question. To date, feasibility has only been demonstrated with complex proprietary research equipment leaving most providers to choose between DCC and timely resuscitation; thereby putting neonates at both immediate and long-term health risk. The need for equipment and a method to allow for DCC and timely resuscitation to occur synchronously has become of paramount importance. In response to this need, the inventor has devised a novel, practical solution that is described in this patent application.

The present invention describes 1) a means to modify clinical workflows immediately following delivery and 2) a hardware modification to commercial infant warmers (CIWs) so that timely implementation of NRP algorithms can be administered while the neonate remains tethered to the placenta. Prior to this invention, caregivers were forced to choose between either DCC or prompt application of NRP. With this invention, caregivers may now cord clamp when medically appropriate and perform any needed NRP in a timely manner.

In the delivery room care of newborn infants there is an ongoing debate in the medical community on whether the provision of warmth and timely effective ventilation during delayed cord clamping is feasible using standard equipment.

It is apparent from the foregoing description of the limitations of current equipment that there is a need for allowing for safe and effective delayed cord clamping of newborn infants in the delivery room.

The present invention provides an apparatus and means for modifying or retrofitting currently available infant warming devices, thereby providing a stable warmed surface on which to implement resuscitation while allowing for safe and effective delayed cord clamping when medically appropriate. No longer will cord clamping be rushed and prematurely performed because of the need to provide the functions of current CIWs.

In addition to retrofitting currently available infant warming devices, the present invention also provides an extending apparatus that can be built into new infant warming devices, i.e. a new infant warming device comprising the extending apparatus, to allow for safe and effective delayed cord clamping.

SUMMARY OF THE INVENTION

The present invention relates to an extending apparatus for providing safe and effective access for a newborn infant to a neonatal warming device while the umbilical cord is still intact comprising: a movable, i.e. extendable and retractable, infant support assembly comprising an infant support tray and longitudinal support guides, wherein the infant support tray is moveable to extend beyond the front of the neonatal warming device.

In further embodiments, the present invention relates to an extending apparatus wherein the support tray is essentially rectangular and comprises a flat surface and from zero to four essentially vertical sides (i.e. the sides are essentially perpendicular or at about 90 degrees relative to the flat surface of the support tray).

In yet further embodiments, the support tray may have from one to four, from zero to three, or from one to three vertical sides. An embodiment with three vertical sides, for example, may have vertical sides on each of the front and left and right edges of the support tray, and no vertical side at the back edge of the support tray.

In further embodiments, the present invention relates to an extending apparatus wherein the support tray is essentially rectangular and comprises a flat surface and three essentially vertical sides.

In further embodiments, the present invention relates to an extending apparatus wherein the support tray comprises a means for grasping the support tray.

In further embodiments, the present invention relates to an extending apparatus wherein the means for grasping the support tray is selected from the group consisting of a handle, a groove, or an opening.

In further embodiments, the present invention relates to an extending apparatus wherein the means for grasping the support tray is an opening.

In further embodiments, the present invention relates to an extending apparatus wherein the support tray comprises a stop for preventing overextension of the support tray.

In yet further embodiments, the stop may be an edge that projects vertically downward from the back end of the tray for preventing the tray from accidentally overextending or disengaging from the longitudinal support guides. In other embodiments, the stop may be a raised surface, bump, protrusion, or edge or partial edge that extends upwards or downwards from the tray.

In further embodiments, the present invention relates to an extending apparatus comprising two longitudinal support guides that are oriented in parallel to each other.

In further embodiments, the present invention relates to an extending apparatus wherein the longitudinal support guides are tubular and each comprise a longitudinal cut-away section.

In further embodiments, the present invention relates to an extending apparatus wherein the longitudinal support guides engage the support tray.

In further embodiments, the present invention relates to an extending apparatus wherein the longitudinal support guides movably engage the support tray (to enable the support tray to be extended and retracted or to freely slide when engaged by the support guides).

In further embodiments, the present invention relates to an extending apparatus wherein the longitudinal support guides further engage the neonatal warming device (e.g., in the slots or grooves normally designed for accommodating X-ray plates).

In further embodiments, the present invention relates to an extending apparatus wherein the warmer comprises a scale and the longitudinal support guides further engage a scale (e.g., in a slot, groove, or recess in the base of the scale) which can be placed on the support tray.

In further embodiments, the present invention relates to an extending apparatus wherein the longitudinal support guides each define a hollow four-sided rectangular cross-section and each comprise a longitudinal cut-away section on the face of one of the rectangular sides.

In further embodiments, the present invention relates to an extending apparatus wherein the longitudinal support guides engage the support tray.

In further embodiments, the present invention relates to an extending apparatus wherein the longitudinal support guides movably engage the support tray (to enable the support tray to be extended and retracted or to freely slide when engaged by the support guides).

In further embodiments, the present invention relates to an extending apparatus wherein the longitudinal support guides further engage the neonatal warming device (e.g., in the slots or grooves normally designed for accommodating X-ray plates).

In further embodiments, the present invention relates to an extending apparatus of wherein the warmer comprises a scale and the longitudinal support guides further engage the scale (e.g., in a slot, groove, or recess in the base of the scale) which can be placed on the support tray.

In further embodiments, the present invention relates to a neonatal warming device comprising an extending apparatus for providing safe and effective access for a newborn infant to a neonatal warming device while the umbilical cord is still intact comprising: a movable infant support assembly comprising an infant support tray and longitudinal support guides, wherein the infant support tray is moveable to extend beyond the front of the neonatal warming device.

In further embodiments, the present invention relates to a method for providing safe and effective access for a newborn infant to a neonatal warming device while the umbilical cord is still intact comprising utilizing the extending apparatus of the present invention.

In further embodiments, the present invention relates to a method for providing safe and effective access for a newborn infant to a neonatal warming device while the umbilical cord is still intact comprising utilizing a neonatal warming device comprising the extending apparatus of the present invention.

In yet further embodiments, the present invention relates to a method for providing safe and effective access for a newborn infant to a neonatal warming device to allow for delayed cord clamping (DCC) of an umbilical cord attached to the infant and mother comprising utilizing a neonatal warming device comprising the extending apparatus of the present invention.

These and other aspects of the present invention will become apparent from the disclosure herein.

BRIEF DESCRIPTION OF THE DRAWINGS

FIG. 1A shows the operating room workflow pathway for a C-section delivery and FIG. 1B shows the delivery room workflow pathway for a vaginal delivery.

FIG. 3 is a perspective view showing the support tray of the extending apparatus extended. The front vertical side and left and right vertical sides of the support tray as well as the means for grasping the tray, which is an opening or aperture, are visible. In this embodiment, the back of the support tray is flat, without a vertical side. The support guides are also visible and engage the support tray and warmer through a groove or slot in the respective side of the warmer.

FIG. 4 is a perspective exploded view showing the warmer, the support tray, and the left and right rectangular support guides and revealing how each support guide engages the support tray and the groove or slot in the respective side of the warmer. For clarity, only part of the warmer is shown in this representation.

FIG. 5 is a perspective exploded view showing the warmer, the support tray, and the left and right tubular support guides and revealing how each support guide engages the support tray and the groove or slot in the respective side of the warmer. For clarity, only part of the warmer is shown in this representation.

FIG. 6 is a perspective view showing the relative positioning of a maternal bedside, a newborn infant with umbilical cord intact, a mother, and an infant warmer that has been retrofitted with a support tray and rectangular support guides. The newborn infant with umbilical cord intact is lying upon a mattress on the support tray in its extended position to provide safe and effective access for the newborn infant to the warming device. The visible support guide engages the support tray and the warmer.

FIG. 7 shows how the extended tray with support guides depicted in FIG. 6 additionally provides easy access for healthcare personnel to attend to both the mother and the newborn infant during delivery, while simultaneously providing safe and effective access for the newborn infant to a neonatal warming/resuscitation device while the umbilical cord is still intact.

FIG. 8 is a side view showing the extending device with the support tray extended, and a scale inserted beneath the mattress and blanket. The support guide is seen to be engaging the support tray and engaging with grooves or slots in the sides of the scale and of the warmer.

FIG. 9 shows the support tray of the extending apparatus extended. The apparatus is engaged with the commercial neonatal warmer. The vertical side and front edges of the support tray as well as the means for grasping the tray, which is an opening or aperture is visible. The support guides are visible and a hospital baby blanket covers part of the mattress which has been pulled back to show more of the support tray and support guides.

FIG. 10 is a view showing the extending apparatus engaged with the commercial neonatal warmer with the support tray in the retracted position. The support guides are visible and are engaging the support tray and engaged with the side slots or grooves of the warmer. The mattress and blanket have been removed.

FIG. 11 is perspective view showing the support tray extended with the support guides visible and engaging the support tray and the warmer. The three vertical sides (front) and (sides) of the support tray and the flat back portion of the support tray (no back vertical side) are visible.

FIG. 12 is a close-up view of a rectangular support guide being oriented for engaging with the support tray and with the slot or groove of the warmer.

DETAILED DESCRIPTION OF THE INVENTION

Figure 1A:
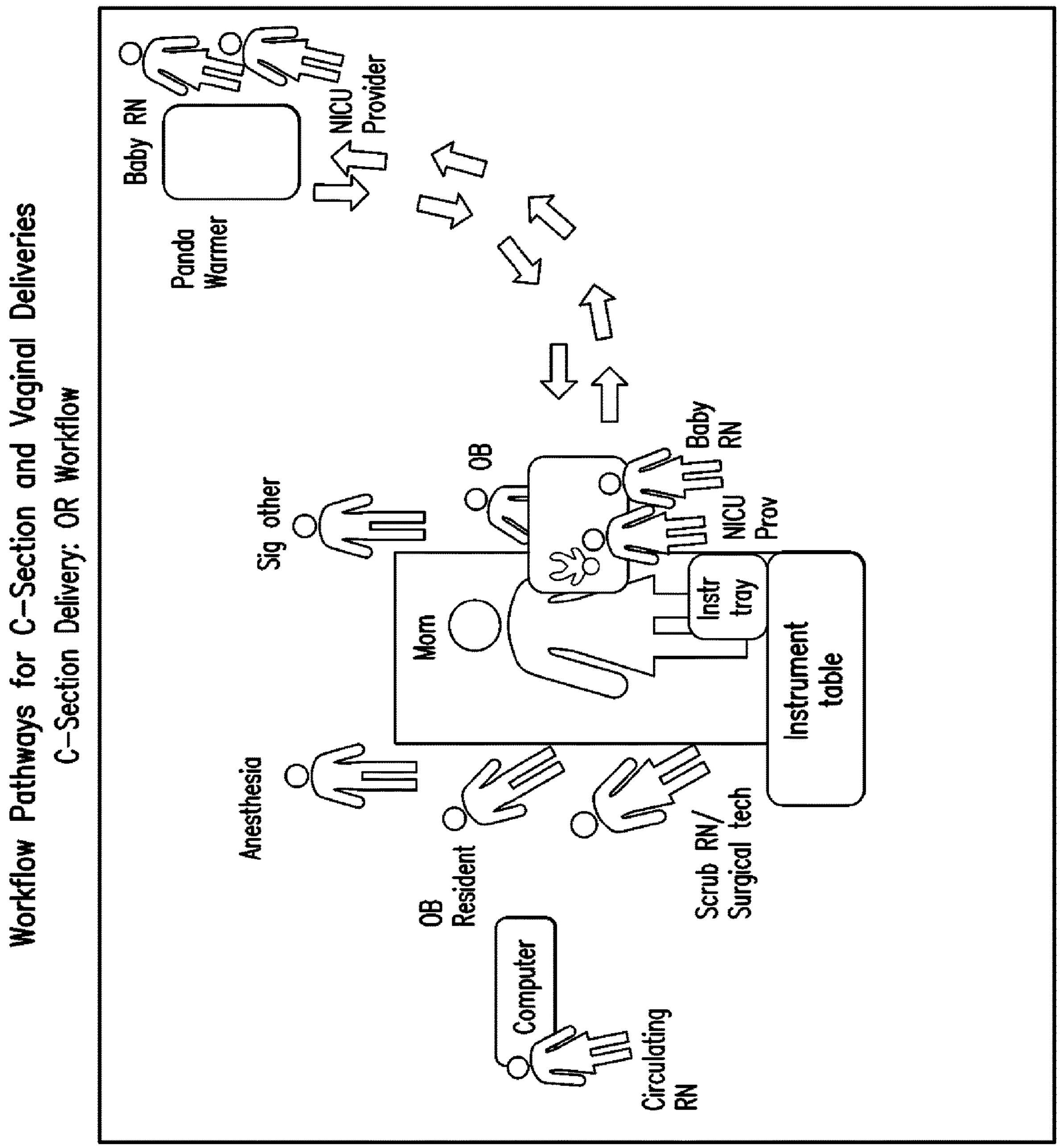
FIGS. 1A and 1B show proprietary protocols developed as part of the present invention to adjust staff positioning to facilitate movement of a CIW to a maternal bedside at time of birth for high-risk deliveries.

Description of the Various Components and Operation of the Extending Apparatus

As discussed above, evidence supporting benefits of delayed cord clamping (DCC) is well established. Placental function is maintained during transition to pulmonary oxygenation and conversion from fetal to newborn circulation. To date, feasibility has only been demonstrated with complex proprietary research equipment leaving most providers to choose between DCC and timely resuscitation.

Using the extending apparatus or the present invention, the methodology focused on using standard delivery room equipment during DCC. Workflow modification protocols facilitated timely implementation of the Neonatal Resuscitation Program (NRP) algorithm with umbilical cord intact until after establishment of effective (spontaneous or assisted) ventilation, while minimizing heat loss to the newborn, and financial burden to the hospital. Simulation training provided a low-risk setting to practice and refine the process of moving the commercial infant warmer (CIW) to the maternal bedside during high-risk deliveries. Major findings included best staff positioning, need for longer air/oxygen hoses, and potential for bowing of the mattress tray. Reliable placement of the newborn on the warmer mattress required a simple reinforcement device, developed to accommodate safe extension of the mattress nine inches beyond the foot of the warmer. All 30 term and late preterm infants enrolled were successfully placed on the warmer mattress extension with cord intact for at least 60 second DCC. Assisted ventilation was delivered easily to infants when indicated. Sterile field integrity was maintained. Mattress tray reinforcement is key to feasibility of using standard CIW to provide warmth and timely steps of NRP during at least 60 second DCC.

A healthy newborn is a universal goal, but risk of complications is multifactorial. The Centers for Disease Control and Prevention (CDC) reports 3,855,500 births occurred in the United States in 2017, 32% were by Cesarean section (C-section). Nearly 10% of births were preterm at less than 37 0/7 weeks, including 7% late preterm (34-36 6/7 weeks) and 3% early preterm (<34 weeks). Just over 3% of births involve twins and 0.1% include all higher order multiples. Approximately 8% of newborns are low birth weight (LBW), less than 2500 grams, and 1.4% very low birth weight (VLBW), less than 1500 grams. Ten percent of deliveries are high risk necessitating attendance by medical professionals certified in neonatal resuscitation. Even during normal labor, events can occur meeting criteria to be a high-risk delivery. These include non-reassuring fetal heart tracing, meconium stained amniotic fluid, instrumented deliveries by vacuum or forceps, a macrosomic (i.e. abnormally large) fetus at risk for shoulder dystocia, and prolapsed cord, for example. The goal of resuscitation at any age is to restore oxygenation of body tissues. At birth is the only time two routes of oxygenation can occur simultaneously: The placenta continues to function as the lungs inflate to assume this responsibility. Historical medical management encouraged immediate umbilical cord clamping and cutting for maternal benefit, overlooking the lost neonatal benefit by preventing the infant from receiving the remaining cord blood. Current evidence illuminates this knowledge and professional expert groups support delaying cord clamping for at least 30 seconds in vigorous newborns of all gestational ages. The American College of Obstetricians and Gynecologists (ACOG) as well as the American Academy of Pediatrics (AAP) committee on neonatal resuscitation program (NRP) declare investigating delayed cord clamping for non-vigorous newborns important research. Whether delaying cord clamping for 60 seconds to obtain an optimal placental transfusion or early cord clamping (ECC) and the provision of timely ventilatory support is of greater benefit is not clear. This research will not answer that question. Instead, the inventor questions why a provider should have to choose between the two. Why not pursue a synergistic benefit by simultaneously providing timely resuscitation steps while maintaining the umbilical cord intact until effective ventilation is established alleviating the need for placental function? Over the past decade, research has been conducted addressing this question. Animal studies demonstrate significant benefit to physiologic delayed cord clamping (PDCC). Research groups on three continents have designed resuscitation trolleys/resuscitaires for such clinical studies. Given the current climate with scrutiny of increasing healthcare costs in all areas, the likelihood of hospitals purchasing expensive new equipment to reap benefit for less than ten percent of newborns seemed unlikely to meet number needed to treat return on investment criteria. This researcher asked, "Doesn't it make the most sense for clinicians to do what they do well using the equipment they are comfortable with while maintaining umbilical cord patency?" Could workflow be changed to accommodate this goal? Knowing thermoregulation at delivery is a focus of NRP 7th edition fueled the clinical question: Is this goal feasible using a resuscitation equipped CIW in this way?

Without specialized research equipment, neonatal birth attendants must choose between (a) waiting to initiate positive pressure ventilation (PPV) and supplemental heat to allow for 60 second delayed cord clamping, or (b) sacrificing placental transfusion through early cord clamping to provide timely positive pressure ventilation.

To date, research focused on resuscitation during delayed cord clamping utilized proprietary resuscitation equipment, expensive to purchase and not readily available. Scarce information is available describing use of standard equipment for delayed cord clamping and was one of the study sites of the UK CORD Trial, which experienced multiple challenges addressed in the literature review section of this manuscript. Scarce evidence exists of investigations using standard delivery room equipment during delayed cord clamping research in the US. The present invention demonstrates the utility and advantages of the extending apparatus of the present invention. It demonstrates the feasibility of retrofitting standard infant warming equipment to modify present workflow patterns to translate evidence into practice.

Simulation repetition is a major contribution to process refinement, collaboration, and atmosphere of teamwork. Pre-briefing, consisting of role assignment and protocol review at each delivery, then debriefing afterward are high priorities. Simulation videos are an educational/refresher tool. Fiscal responsibility was a constant consideration and an impetus to retrofit conventional equipment. Retrospective data has been collected on 450 high-risk deliveries over a period of 7 months at the study site.

Clinical Research Question

Is it feasible to provide warmth to newborns and elicit timely effective ventilation during at least 60 second delayed cord clamping using a resuscitation equipped commercial infant warmer?

Framework of the Research

This research was guided by the principles of translational science. Whether termed translational medicine or translational research, multiple definitions exist. Nursing has captured the essence of this concept to form a theoretical framework reciprocally integrating terminal degree holder roles within the nursing profession.

The Extending Apparatus

As described herein the extending apparatus is useful for retrofitting an existing commercial infant warmer 5 such as the GE Healthcare Panda Warmer. Furthermore, the present invention contemplates the construction of an infant warmer with the extending apparatus of the present invention already built-in to it.

Figure 3:
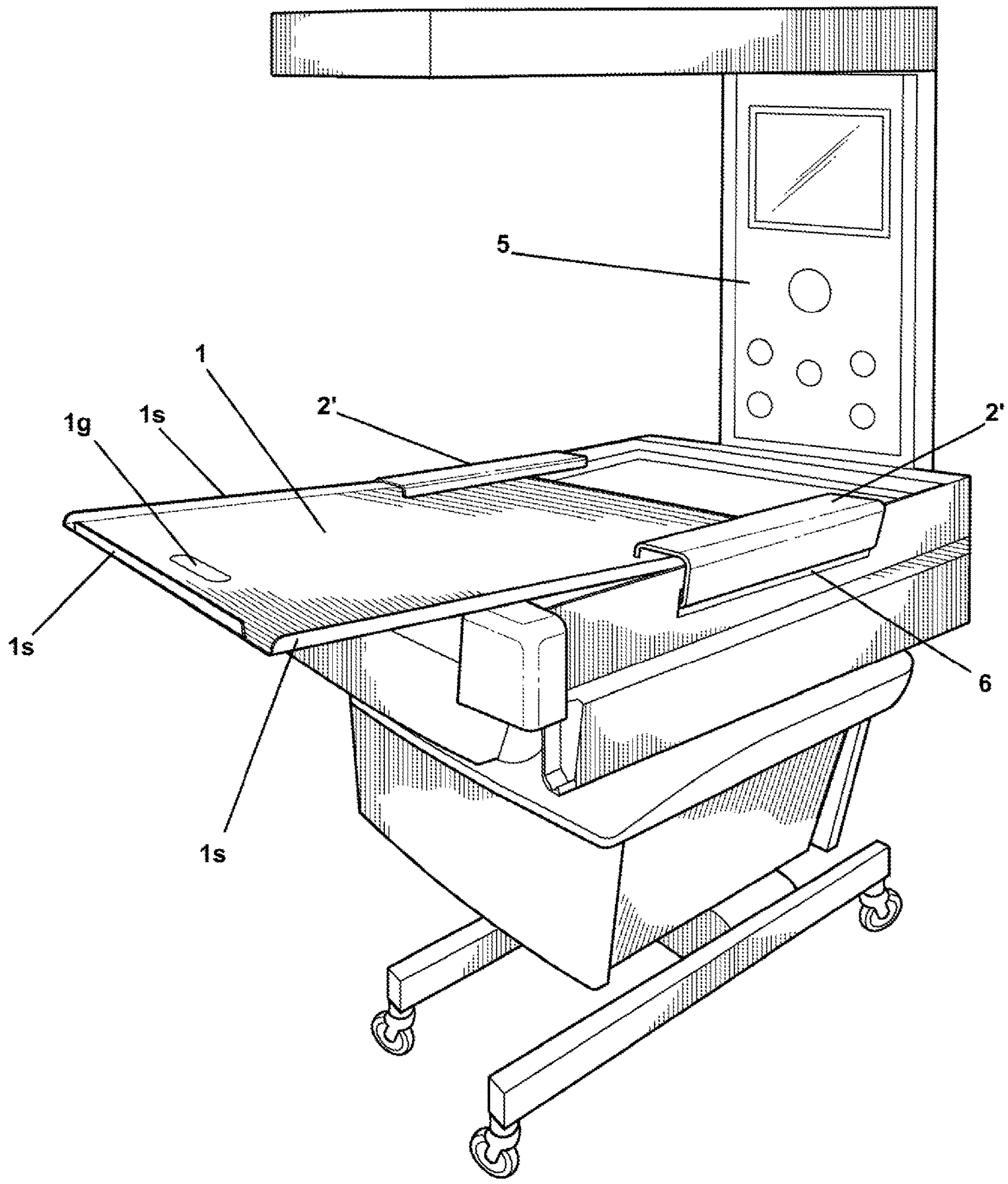
FIGS. 3 through 12 show various embodiments of the present invention. These figures show the support tray 1 and support guides (also referred to as tracks, or right and left guides, or right and left tracks) 2 or 2', where 2 indicates embodiments where the support guides are tubular and comprise a longitudinal cut-away section (tubular support guides), as shown in FIGS. 5 and 8, and 2' indicates embodiments where the support guides define a hollow four-sided rectangular cross-section comprising a longitudinal cut-away section on the face of one of the rectangular sides of the guide (rectangular support guides), as shown in FIGS. 3, 4, 6, 7 and 9 through 12. Also shown in some embodiments of these figures are a mattress 3 and hospital baby blanket 4. These figures also show an existing infant warmer 5 that has been retrofitted with the apparatus of the present invention, i.e. the extender comprising a support tray 1 and support guides 2 or 2'.
Figure 10:
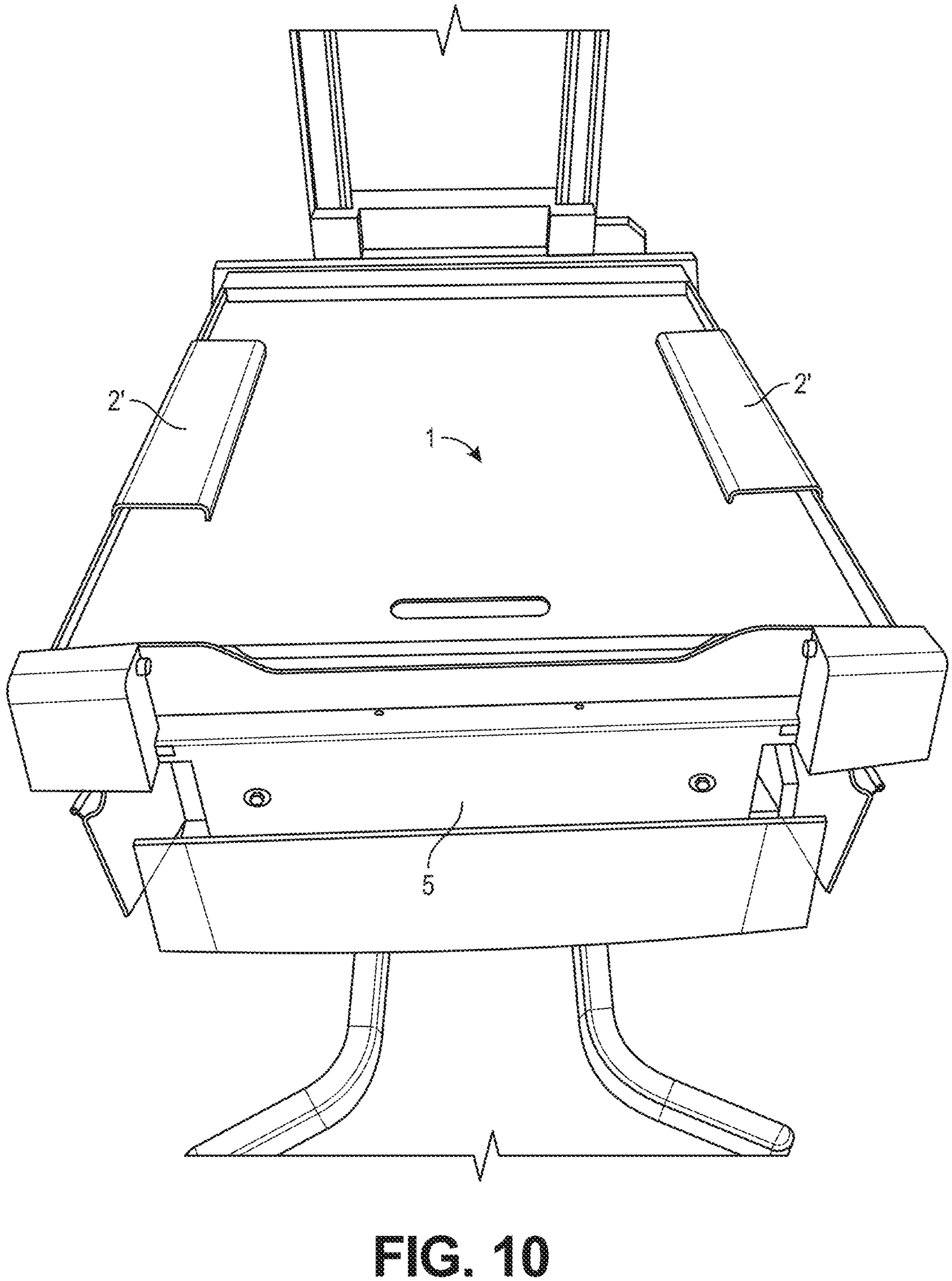
Figure 11:
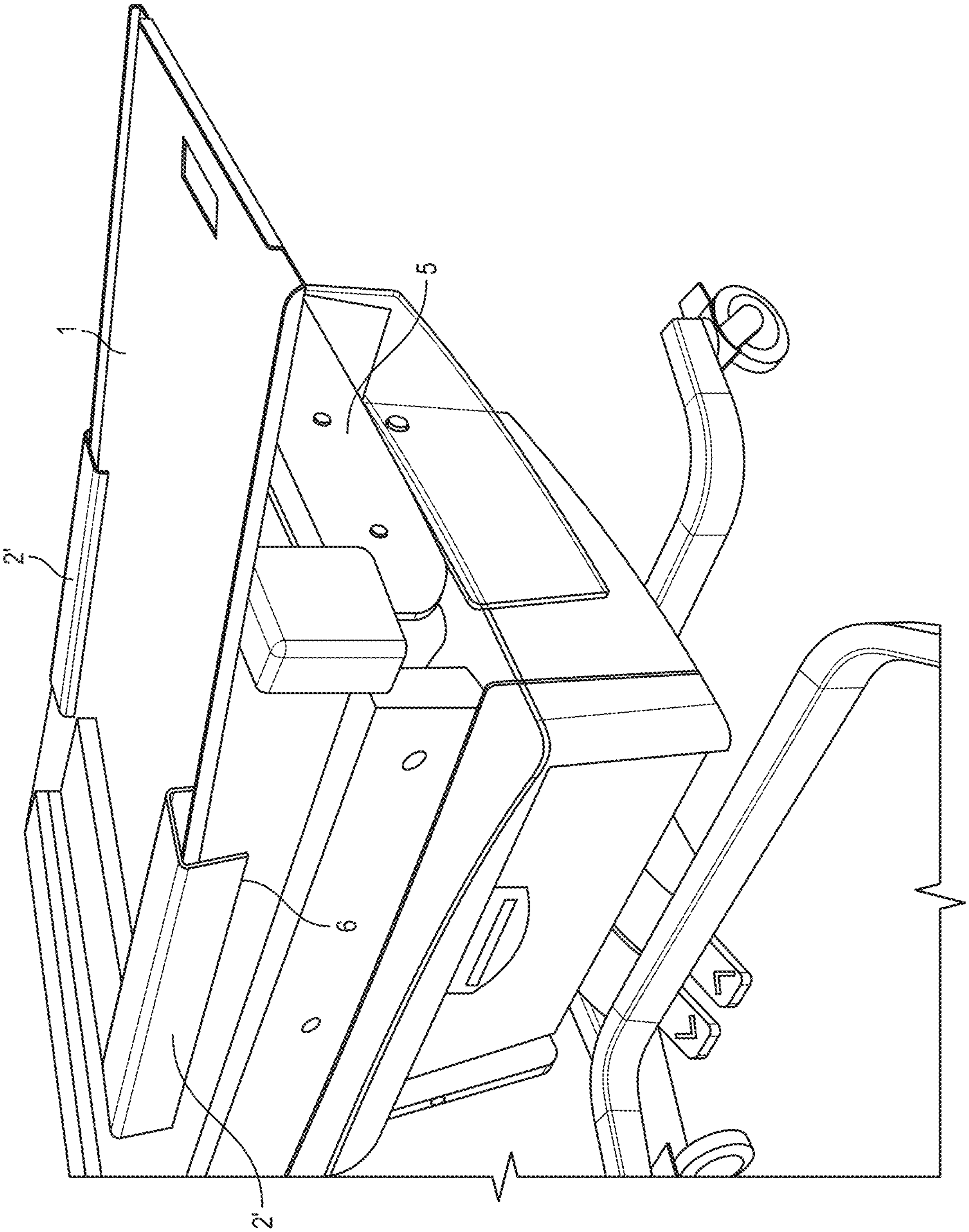

The extending apparatus of the present invention provides safe and effective access for a newborn infant to a neonatal warming device while the umbilical cord is still intact. As shown in FIG. 3, the extending apparatus comprises a movable, i.e. extendable and retractable, infant support assembly comprising an infant support tray 1 and longitudinal support guides 2 (also referred to as tracks, or right and left guides, or right and left tracks). The infant support tray 1 is moveable to extend beyond the front of the neonatal warming device 5. FIGS. 3 and 11, for example, show the support tray in its extended position, while FIG. 10 shows the support tray in its retracted position.

Figure 9:
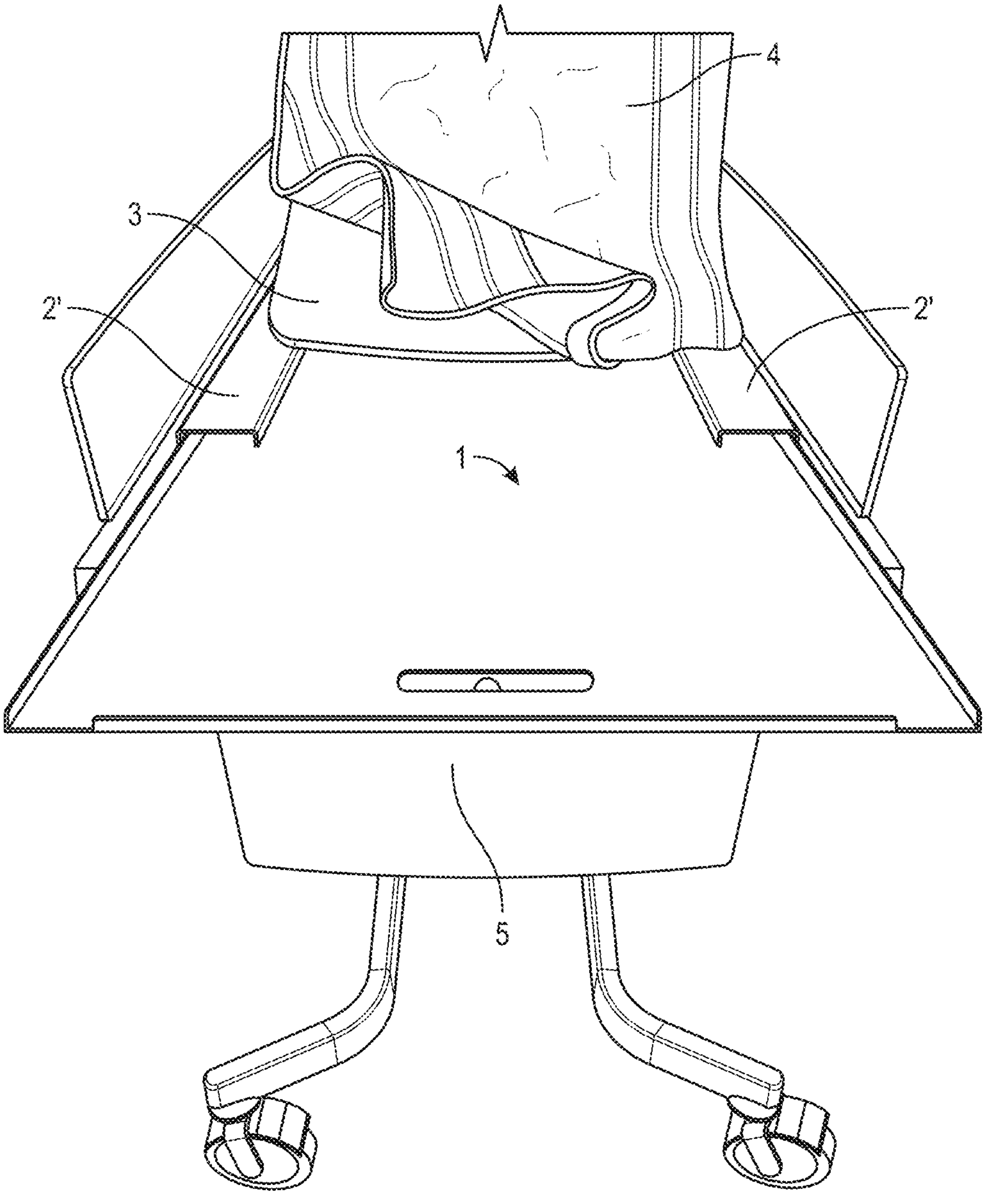

As shown in FIG. 9, the extending apparatus may further comprise a mattress 3 (including chemical mattresses, e.g. a mattress bag with chemicals that can be activated for self-warming, for <32 wks. delivery) and a hospital baby blanket 4.

Figure 4:
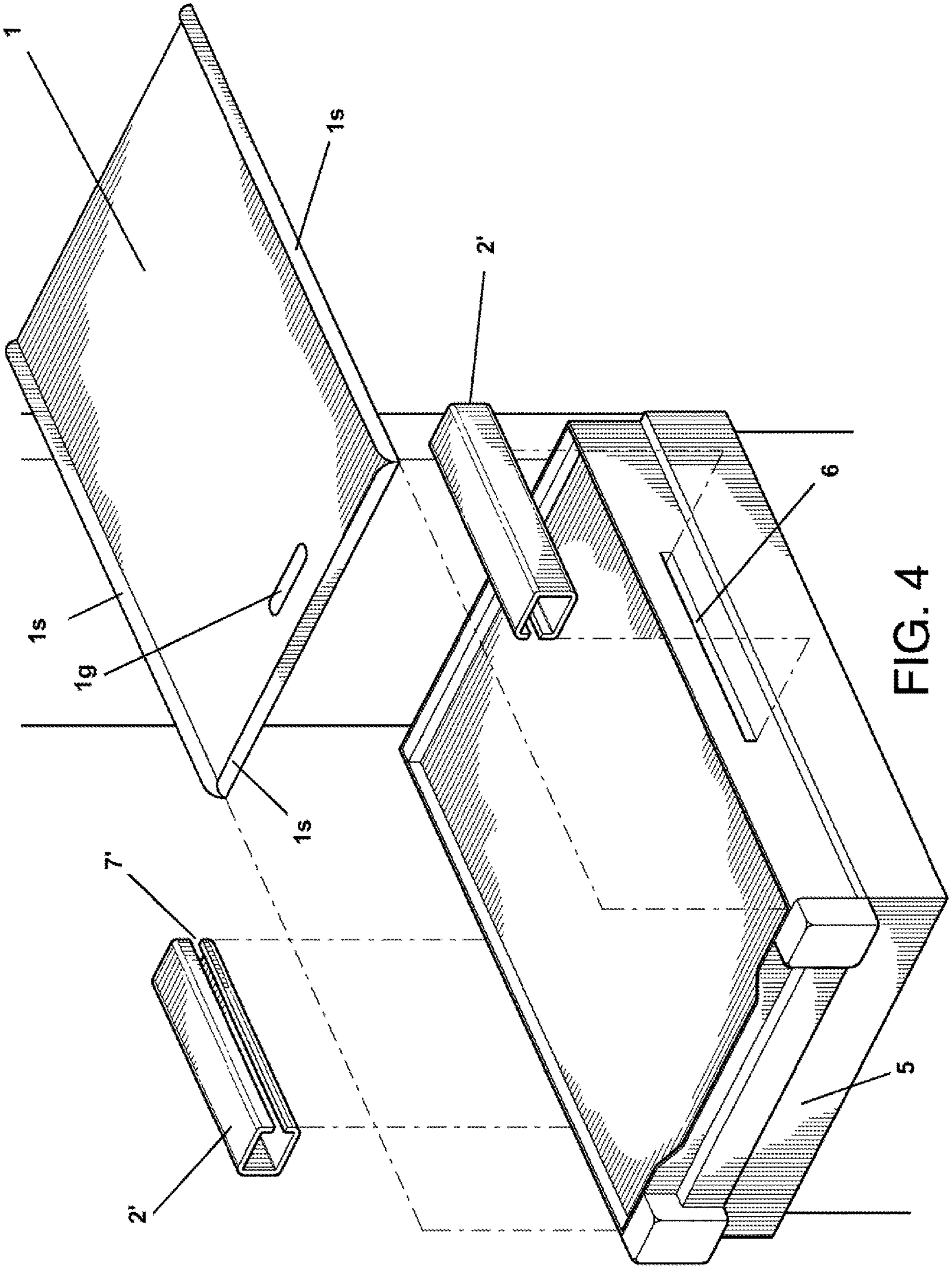
Figure 5:
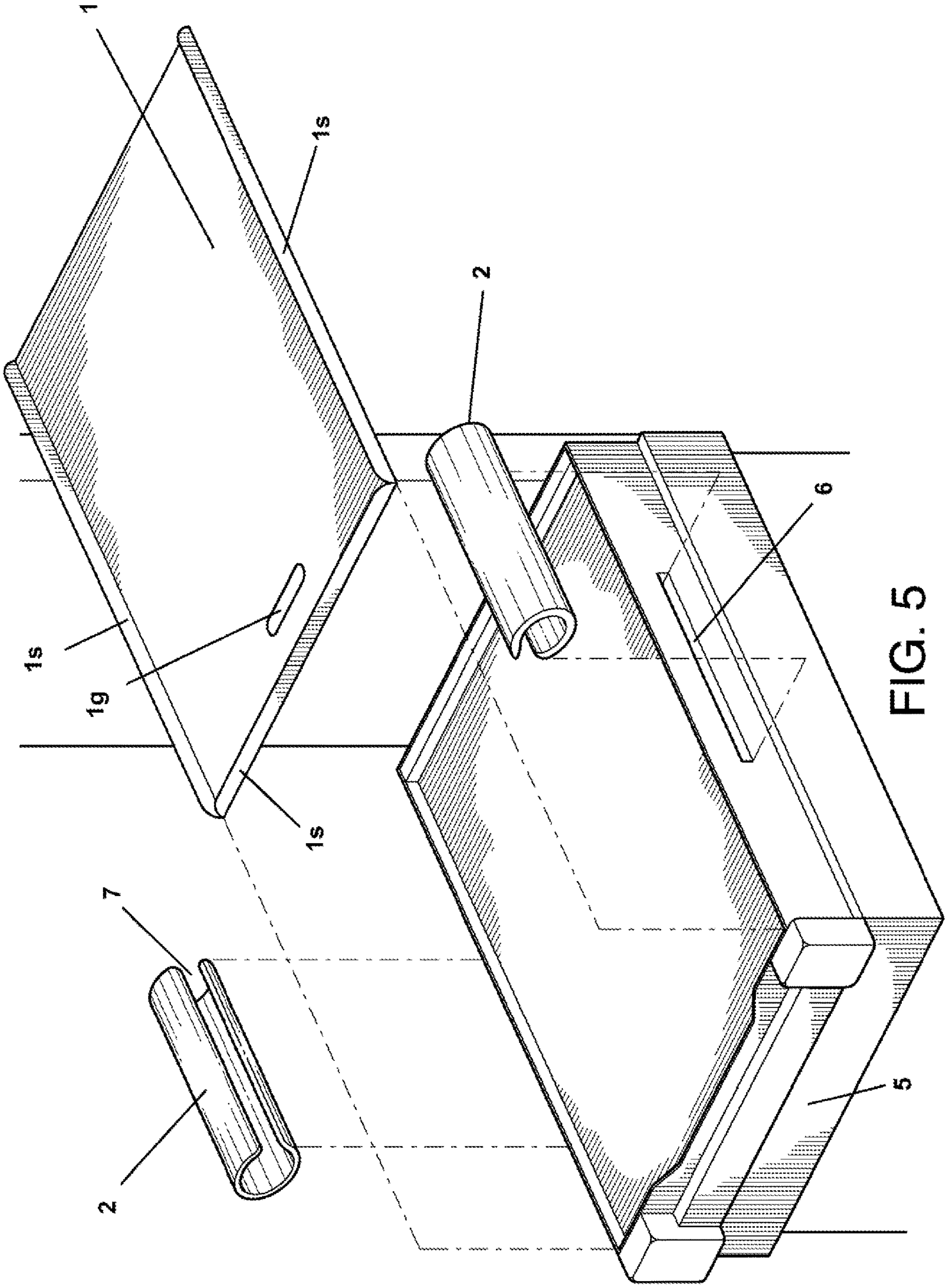

FIGS. 4 and 5 are perspective exploded views of the support tray, guides, and the base of the commercial warmer. As can be seen in these figures, the support tray 1 is essentially rectangular and comprises a flat surface and from one to four essentially vertical sides 1*s*. In some embodiments, such as those depicted in FIGS. 4 and 5, the tray may comprise three essentially vertical sides (front side and two parallel sides with no back side). The support tray 1 may additionally comprise a means for grasping 1*g*, which can be selected from the group consisting of a handle, a groove, or an opening. A preferred means for grasping 1*g* the support tray 1 is an opening, as illustrated in the figures. The support tray may further comprise a stop for preventing overextension or disengagement of the support tray from the longitudinal support guides. The stop may include a ridge, a vertically downward oriented or angularly extending surface extending from the bottom of the tray 1, or other such means. In other embodiments, the stop may be a raised surface, bump, protrusion, or edge or partial edge that extends upwards or downwards from the tray.

Figure 8:
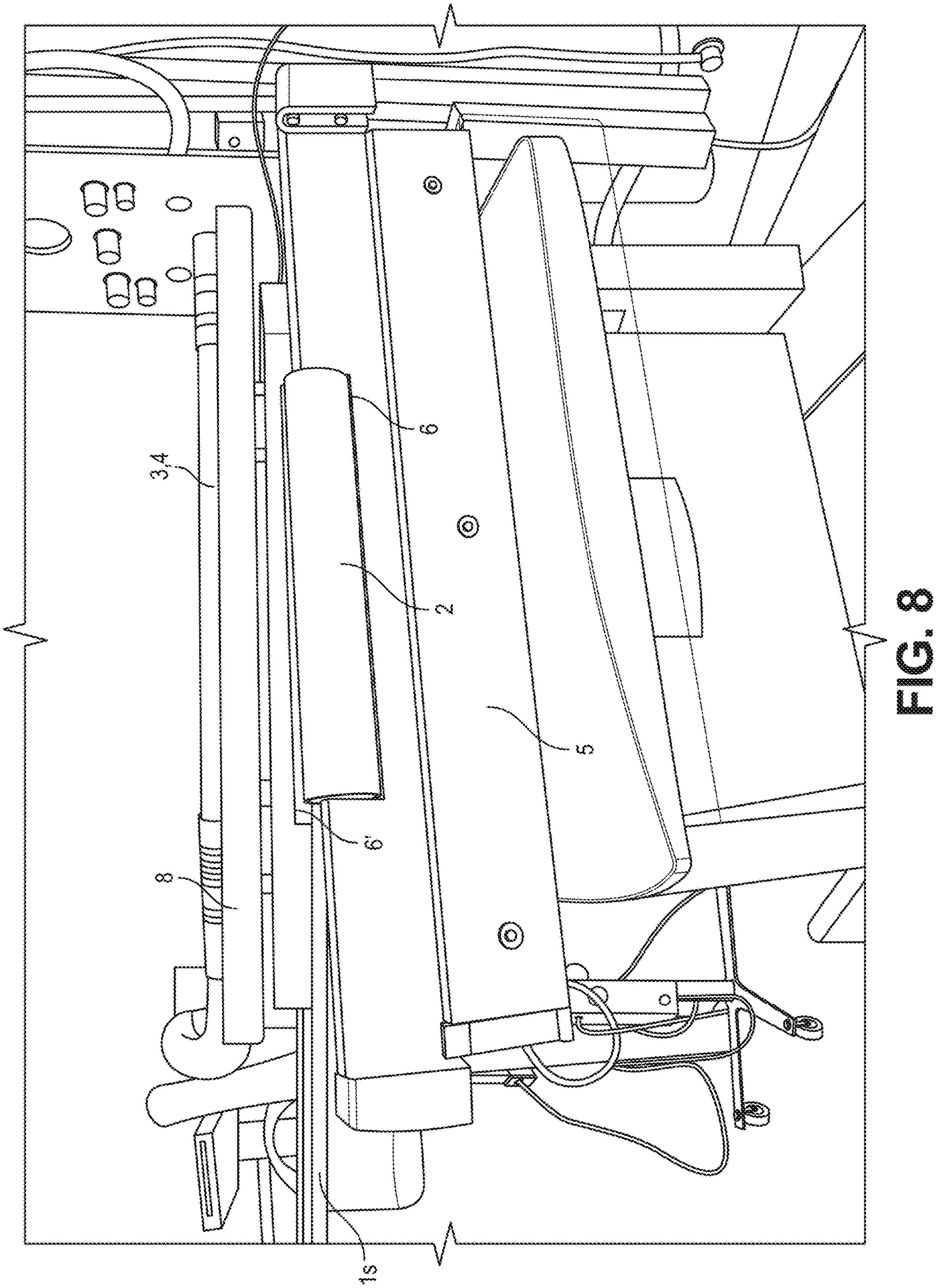

The extending apparatus additionally comprises two longitudinal support guides 2 that are oriented in parallel to each other. In some embodiments, such as shown in FIGS. 5 and 8, the longitudinal support guides 2 are tubular and each comprise a longitudinal cut-away section 7. In other words, a cross-section of the longitudinal supports would show that they do not define a complete circle. These tubular support guides 2 engage the support tray, and movably engage the support tray 1 (to enable the support tray to be extended and retracted). These tubular support guides 2 further engage the neonatal warming device 5, and in certain embodiments can be achieved where the warming device 5 has a built-in groove or slot 6 for accommodating an X-ray plate. In other embodiments, such as shown in FIGS. 4 and 9-12, the longitudinal support guides 2' each define a hollow four-sided rectangular cross-section, and each comprise a longitudinal cut-away section 7' on the face of one of the rectangular sides. In other words, a cross-section of the longitudinal supports would show that they do not define a complete rectangle. These rectangular support guides 2' engage the support tray, and movably engage the support tray 1 (to enable the support tray to be extended and retracted). These rectangular support guides 2' further engage the neonatal warming device 5, and in certain embodiments this engagement can be achieved where the warming device 5 has a built-in groove or slot 6 for accommodating an X-ray plate.

Figure 12:
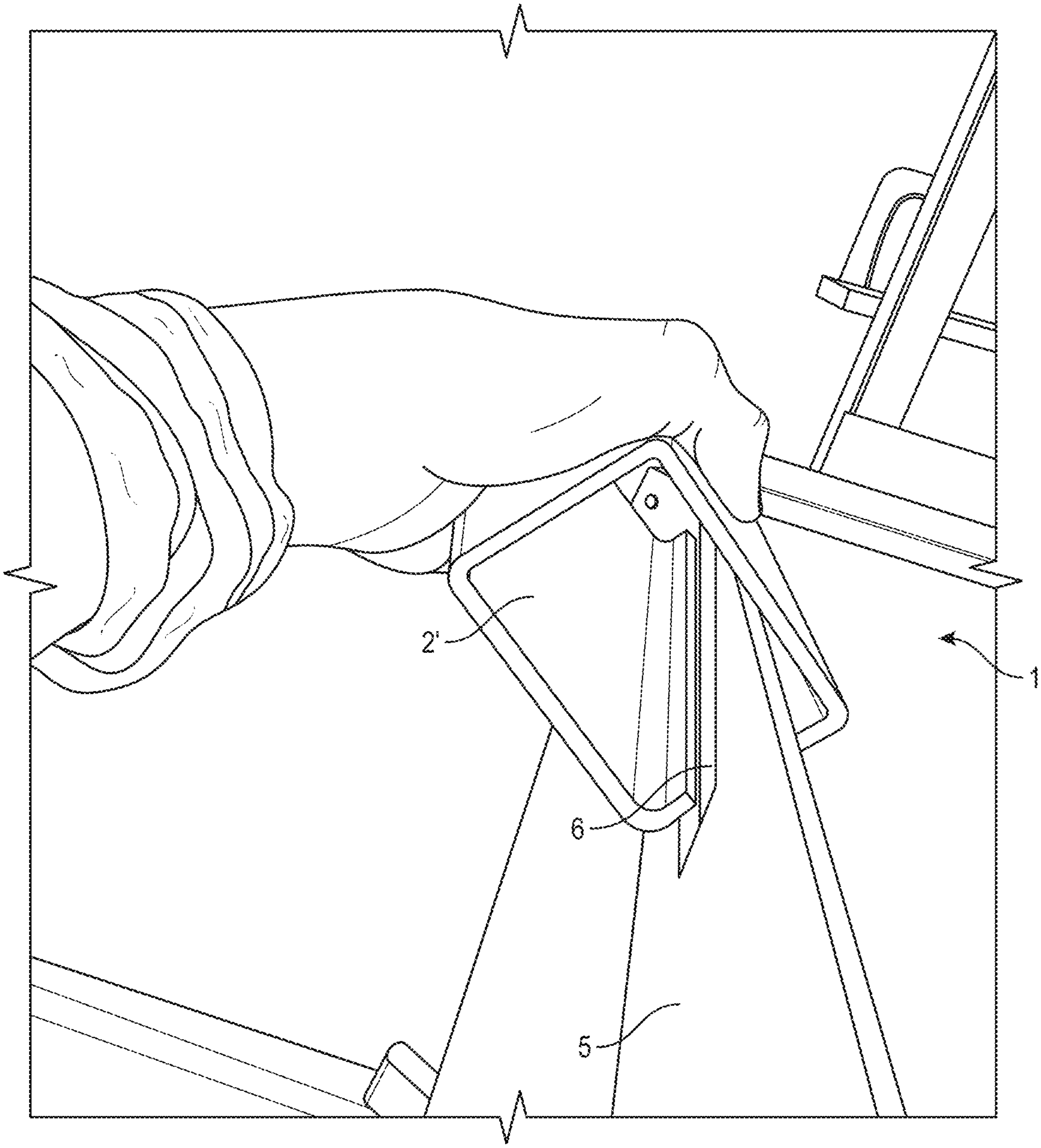

FIG. 12 is a closeup view of the guide 2 oriented for insertion into the built-in groove or slot 6 of the warmer 5 so as to engage the support tray 1 and the warmer 5.

In further embodiments of use, the extending apparatus of the present invention can be used in conjunction with a scale for weighing the newborn. FIG. 8 shows a scale 8 situated under the blanket 4 and the mattress 3 and on top of the tray 1. It should be noted that the support guides 2 also engage with slots or grooves 6' in the base of the scale 8 to retain it in place when the tray 1 is extended.

It is contemplated that the support guides of the present invention can be constructed in a variety of shapes and forms to retrofit and engage with any appropriate groove, slot, or recess of an existing infant warmer, as long as the support guide can both engage with the warmer and with the extendible support tray so that the support tray can be extended and retracted, while providing adequate stability and support.

The present invention provides a method for providing safe and effective access for a newborn infant to a neonatal warming device while the umbilical cord is still intact comprising utilizing the extending apparatus of the present invention, whether retrofitted to a commercial infant warmer or built into an infant warmer.

Figure 6:
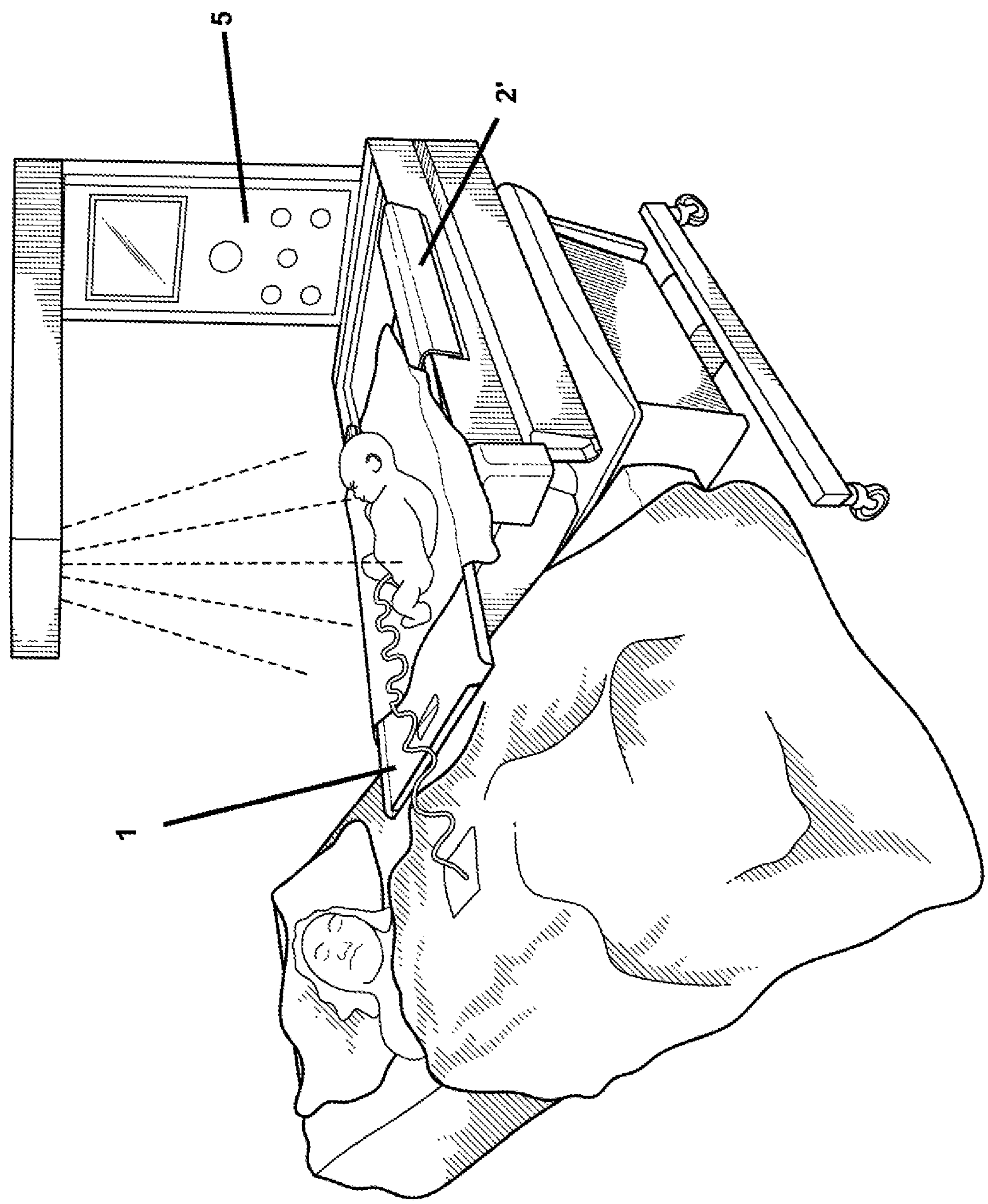
Figure 7:
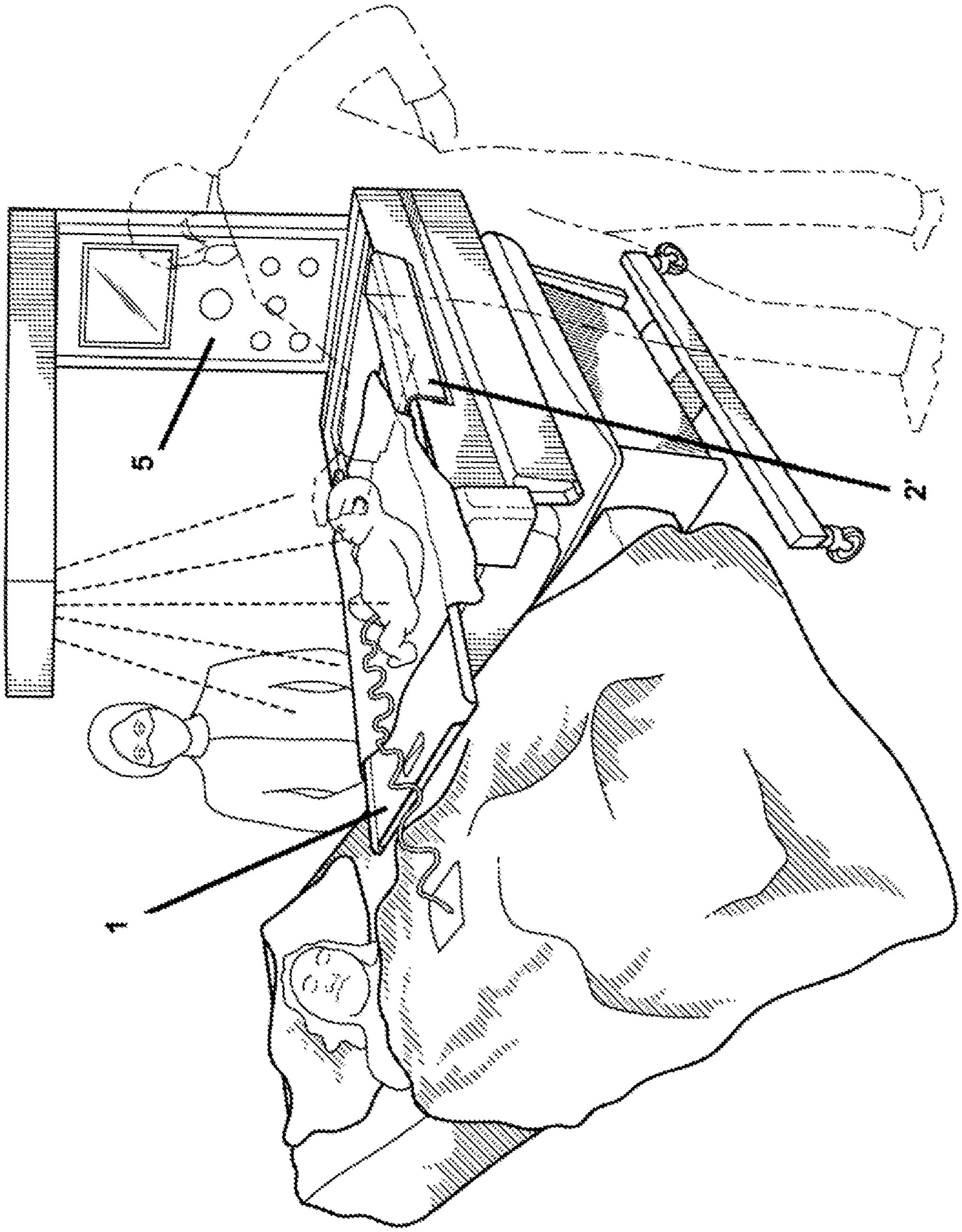

FIG. 6 illustrates how the extending apparatus of the present invention may be applied to an infant warmer to provide safe and effective access for a newborn infant to the neonatal warming device while the umbilical cord is still intact and to allow for delayed cord clamping (DCC). FIG. 7 additionally illustrates how the extending apparatus depicted in FIG. 6 additionally provides easy access for healthcare personnel to attend to both the mother and the newborn infant during delivery, while simultaneously providing safe and effective access for the newborn infant to a neonatal warming/resuscitation device while the umbilical cord is still intact.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

Example 1: Evaluation of the Extending Apparatus

Best START (Stimulate, Thermoregulate, And Resuscitate Timely) with Delayed Cord Clamping: A Feasibility Trial Methodology Knowledge Application and Project Development A less disruptive transition of cerebral circulation transpires when effective ventilation is established prior to umbilical cord clamping translating to reductions in morbidity (IVH) and mortality. According to ACOG (2017), the ability to provide DCC is institutionally inconsistent; therefore, decisions concerning DCC are best made by the mother-baby team. The study site is a 371-bed community teaching hospital hosting approximately 2,200 births per year. The current standard of care at the hospital, is to provide vigorous infants of all gestational ages with 60 seconds of DCC. Infants born by C-section remain on the surgical drape covering mother's legs enduring the cold of the OR without a heat source for that 60 seconds. Non-vigorous infants receive a less standardized approach based on the NICU provider's evaluation of the risk/benefit balance of DCC versus early cord clamping to provide timely PPV before 60 seconds in each individual case. This complicates the anticipatory ability of supportive staff. In all births by C-section, the partially dried newborn is carried across the OR in the hands of an obstetric provider to the CIW.

To improve the quality of care provided to all gestational aged infants born at high risk deliveries, we implemented a standardized approach to neonatal resuscitation at high risk deliveries enabling simultaneous warming and PPV during delayed cord clamping, as well as safe transport across the OR by using a standard CIW, in this setting Panda warmers, by virtue of a new workflow. This protocol was named the Best START (Stimulate, Thermoregulate, And Resuscitate Timely) with DCC, a summation of the goals.

Figure 1B:
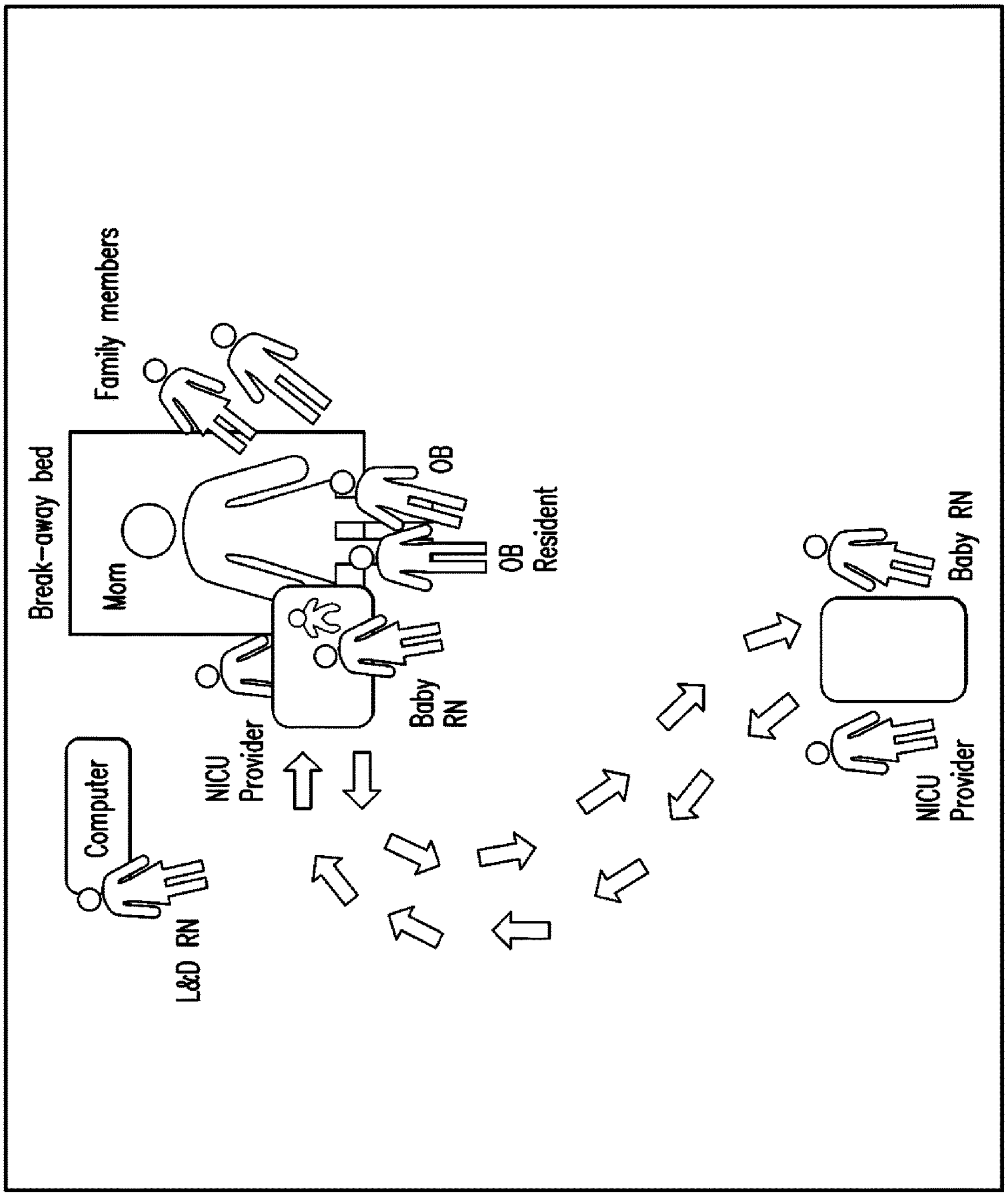
Figure 2:
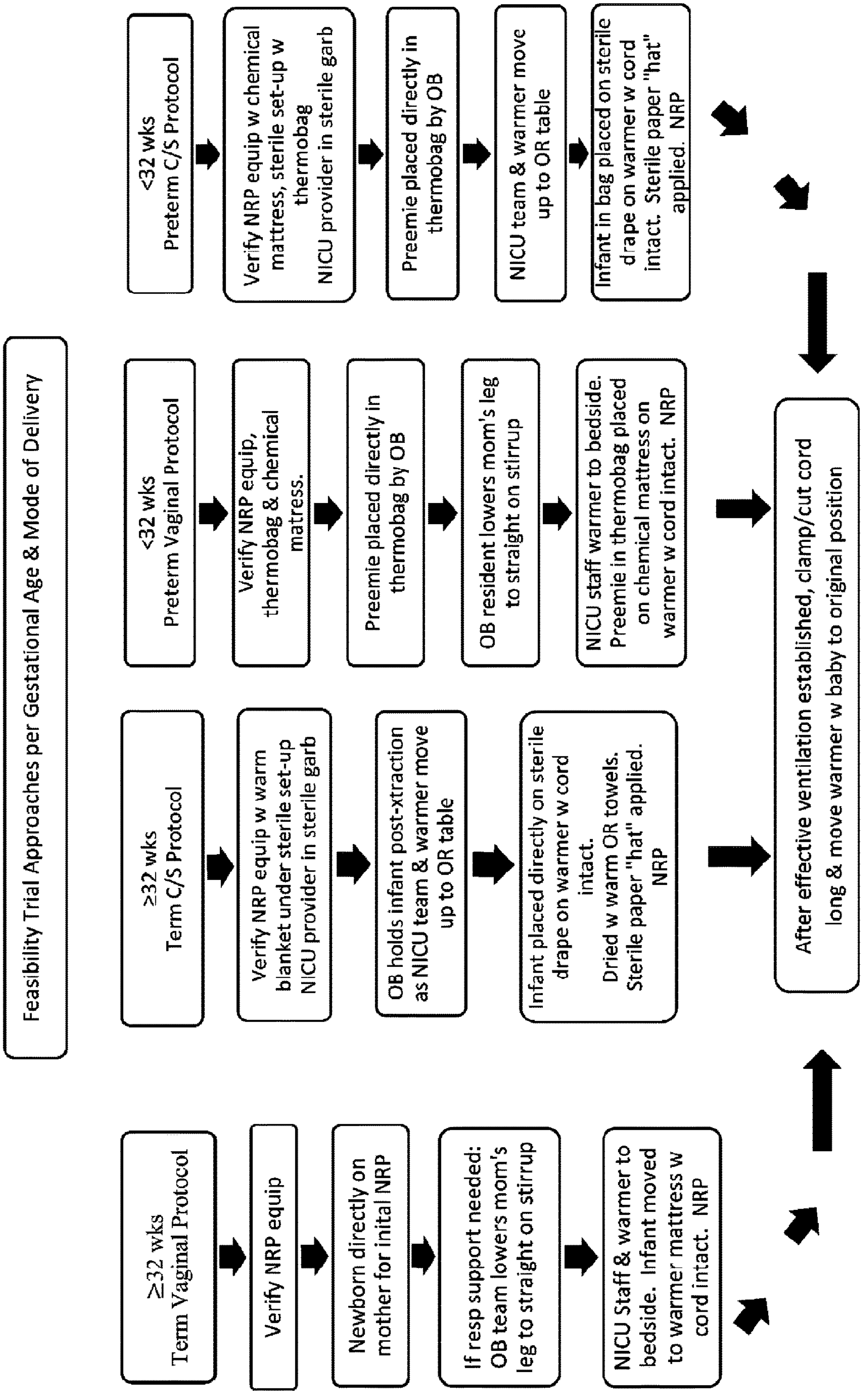
FIG. 2 shows a flow chart of protocol approaches to ensure that both providers and patients are in the correct position at the correct time.

In accordance with the present invention, FIG. 1A shows a workflow pathway for a C-section delivery and FIG. 1B shows a workflow pathway for a vaginal delivery. Moreover, FIG. 2 shows protocol approaches according to gestational age and mode of delivery have been developed to ensure that both providers and patients are in the correct position at the correct time.

Approval Process

Hospital approval was granted for implementation of four proprietary preliminary protocols (term C-section birth, preterm C-section birth, term vaginal birth, preterm vaginal birth) to be used to develop later-stage protocols subsequent to physical enactment and participant feedback. Simulation training was provided. Also, throughout the formative process approval was garnered from Infection Control, Biomedical Engineering, Risk Management, Safety and Security.

Simulation Discovery

Through the course of repeated simulations in a realistic looking OR and delivery room using actual equipment/supplies and a maternal—infant manikin set which could simulate both methods of delivery, it was discovered that longer air and oxygen hoses would be required, bowing of the plexiglass mattress tray was a safety concern and would therefore require reinforcement, and the presence of a respiratory therapist was not essential. The number of neonatal providers required to dress in sterile garb proved to be a dynamic point, changing multiple times based on an abundance of caution to avoid contamination of the C-section sterile field. Simulations began in a learning laboratory, then moved in situ to the OR. The simulation center provided long-term availability of the manikin duo, thereby facilitating an informal simulation room to be set up in one of the private family neonatal intensive care unit (NICU) rooms. Several simulations were performed. Delivery room simulations were conducted over two consecutive weekends dubbed 'Simulation Saturdays' across all shifts to capture an optimal number of staff members. Environmental Services provided education on CIW cleaning and set up, but also rationale for the research.

Study Design

The feasibility trial was designed to be the initial step of a larger research study aiming to answer the question: What is the impact of providing comprehensive delivery room care including warmth and the ability to provide immediate PPV during DCC on neonatal outcomes? Outcome measures include newborn transition characteristics (resuscitation measures required, oxygen requirement, Apgar scores, temperature at 5 minutes and admission), morbidity (IVH, hypoxic ischemic encephalopathy, bronchopulmonary dysplasia, retinopathy of prematurity), length of stay, and mortality.

A retrospective medical record review of infants delivered over a period of 7 months was performed and provides a baseline of delivery data associated with current standard practice. Statistics can be compiled on the frequency the DCC vs PPV dilemma occurred. Data concerning the newborn time period can be used to show potential trends in newborn stabilization and transition to extra-uterine life.

Upon initiation of utilizing Panda warmers during DCC, prospective data collection began at each DCC delivery with additional data points collected during the birth hospitalization. Verbal assent was granted by mothers scheduled for delivery by C-section. A waiver of signed informed consent was granted by IRB in agreement that conditions where infants were likely to gain the greatest benefit from this protocol were those in which ability to obtain informed consent would be the most difficult if not impossible to obtain. Medical information was collected on data sheets. A revision request was granted by IRB to include maternal pre- and post-delivery hematocrits. It was deemed important by the obstetric residents to have local data to compare with prior evidence noting no significant difference in blood loss or hemoglobin level associated with early or delayed cord clamping.

Confidentiality—protection of health information. Patients were assigned a case number. Paper delivery data sheets were labeled with the case number and kept in a restricted area for transcription to a password protected computer PI within 48 hrs. Hard copies were stored in a locked filing cabinet in a locked office.

Selection and withdrawal of subjects.

Inclusion Criteria. 30 infants of all gestational age born by high risk delivery, which include:

1. All C-section deliveries
2. All deliveries at less than 37 weeks gestation (preterm)
3. All deliveries with meconium stained amniotic fluid
4. All deliveries of suspected large babies at risk for shoulder dystocia
5. All deliveries with non-reassuring fetal heart tracings
6. All deliveries with chorioamnionitis (sepsis)
7. All instrumented deliveries (delivery assistance with forceps or vacuum)
8. All deliveries of multiples (twins, triplets, etc.)
9. Any unquantified suspicion of risk prompting the OB team to request neonatal provider attendance Exclusion Criteria:

1. Infants born vaginally with good tone and immediate skin-to-skin with mother (DCC without warmer) who establish effective ventilation by crying and remain skin-to-skin with mother
2. Infants with tight nuchal cord cut after delivery of the head, before delivery of the body
3. Infants of mothers with placenta problems such as previa, abruption, accreta, or velamentous insertion
4. Twins/Triplets with blood flow discrepancies
5. Infants of parents who decline DCC for the sake of cord blood banking (this is sometimes part of a birth plan.

Treatment of subjects. Mothers and neonates are expected to traverse the birth process as they otherwise would. Birth plans were honored. Emerging evidence demonstrates sub-optimal benefits when effective ventilation is not established prior to concluding DCC. The research herein demonstrates that the most beneficial practice is feasible using current hospital owned Panda warmers. Retrospective data from deliveries using current standard practice can be utilized to establish a baseline to demonstrate at least equivalent outcomes. Use of panda warmers is standard practice, however timing is situational and provider dependent, standardization of process is expected to improve anticipatory efforts of all team members.

Assessment of Efficacy. Highly respected professional organizations have published position statements in favor of DCC. These same organizations accept the NRP algorithm as the gold standard guideline of neonatal resuscitation. However, in current practice, they are mutually exclusive beyond 30 seconds. The current study is an attempt to assimilate the two and mitigate the need for a force choice of only one. Infants are not be subjected to any additional testing beyond what is routinely performed in response to their medical status.

Assessment of Safety. Safety issues are those of coordinated movements of staff members within the same physical space and that of electrical cords and air/oxygen hoses outstretched for approximately five minutes while the Panda warmer is rolled up to the mother's hip, then rolled back against the wall.

Possible risks to the patient include:

- Inadvertent contamination of the mother's sterile field during C-sections (decreased risk with simulation exercises)
- Inadvertently contaminating the OB resident who will be dressed in sterile garb (decreased risk with simulation exercises)
- The umbilical cord may be too short to reach the warmer mattress (in this instance current standard of care is provided)
- Increased change in maternal hematocrit if increased time to move warmer from OR table (Retrospective pre- and post-hematocrits will be used to determine average change)

This protocol encourages communication between obstetric and neonatal providers prior to, during, and after delivery. If at any point, any provider has a concern for the safety of the mother or the newborn, that provider has the authority to instruct the team to revert to standard care.

Collection of data. Demographic and observational data are recorded on paper delivery data sheets. This information is also entered electronically into the infant's medical record in the form of a delivery attendance note. The PI retrieves IRB approved data from the delivery data sheet and the infant's medical record. IRB approved retrieval of maternal information is facilitated by the linked charts feature of the medical record. Retrospective data are collected electronically from a list produced by the Information Technology department of all deliveries over a 7-month period. Participant enrollment begins for scheduled C-sections.

Statistical analysis. The data is analyzed by descriptive statistics. Feasibility data is reported based on demographics, delivery characteristics, and successful placement of newborn on the Panda warmer. In the full study, retrospective data is compared to prospective data broken down into groups by delivery type (C-section or vaginal) and gestational age groups:

1. Extremely preterm <28 weeks and very preterm 28-32 weeks infants
2. Early preterm 32-34 weeks and late preterm 34-37 weeks infants
3. Early term through post-dates 37-42 weeks Measures of central tendency are reported and student t-tests used to determine significant differences with a 95% confidence interval and a p value of 0.05. Monthly run-charts are used to assess delivery room process compliance and short/long term physiologic outcome trends.

Results

Feasibility data collection began with limited supplies under controlled circumstances. It was reasonable to 'go live' with the most controlled high-risk deliveries, scheduled C-sections. Table 1 reflects the data pertinent to feasibility in a controlled setting where protocol fine detail formative evaluation was still in progress.

TABLE 1

Early Term and Full Term Scheduled Cesarean Section Feasibility Trial Delivery Data

| Case # | Gest Age (wks) | Mode of Delivery/ Presentation | Placed on CIW during DCC | Apgar scores | Time SpO2 reached 80% | SpO2 at 5 min (%) | Resp support in 1st min | Room temp in OR or DR (F.) | Infant's axillary temp at 5 min (C.) | Skin-to-skin time with mother (min) | Admission temp (C.) |
|---|---|---|---|---|---|---|---|---|---|---|---|
| 1 | 38-40 | Sched C/S-B | Yes | 8-9 | 4 | 99 | PPV – no O2 | 67 | 36.2 | 10 | 36.3 |
| 2 | 38-40 | Sched C/S-V | Yes | 9-9 | 3 | 90 | none | 67 | 35.3 | 10 | 36.2 |
| 3 | 38-40 | Sched C/S-V | Yes | 9-9 | 2 | 84 | none | 67.2 | 35.5 | 10 | 36.6 |
| 4 | 38-40 | Sched C/S-B | Yes | 8-9 | 4 | 82 | none | 67.2 | 36.3 | 10 | 36.4 |
| 5 | 38-40 | Sched C/S-V | Yes | 8-9 | 5 | 78 | none | 67.2 | 36.5 | 10 | 36.1 |
| 6 | 38-40 | Sched C/S-V | Yes | 9-9 | 5 | 80 | none | 67.1 | 36.1 | 10 | 36.9 |
| 7 | 38-40 | Sched C/S-V | Yes | 9-9 | 3 | 93 | none | 67 | 34.3 | 10 | 36.7 |
| 8 | 38-40 | Sched C/S-V | Yes | 9-9 | 3 | 85 | none | 67.1 | 36 | 10 | 37.2 |
| 9 | 38-40 | Sched C/S-V | Yes | 8-8 | 5 | 73 | none | 67.6 | 35.1 | 10 | 36.4 |
| 10 | 38-40 | Sched C/S-V | Yes | 7-8 | 5 | 48 | none | 67.2 | 36.5 | 10 | 36.4 |
| 11 | 38-40 | Sched C/S-B | Yes | 9-9 | 4 | 86 | none | 67.2 | 36.4 | 10 | 36.6 |

Notes for Table 1. Gestational age is weeks and 0/7 to weeks and 6/7 (i.e. 38 0/7 weeks to 40 6/7 weeks). Presentation is indicated by B = breech or V = vertex. Min = minutes. F. = Fahrenheit. C. = Celsius.

After all delivery rooms were equipped to accommodate the Best START with DCC protocol, data collection resumed under real life less predictable circumstances as displayed in Table 2.

TABLE 2

Late Preterm to Post Term High-Risk Scheduled and Unscheduled Deliveries Feasibility Data

| Case # | Gest Age (wks) | Mode of Delivery/ Presentation | Placed on CIW during DCC | Apgar scores | Time SpO2 reached 80% | SpO2 at 5 min (%) | Resp support in 1st min | Room temp in OR or DR (F.) | Infant's axillary temp at 5 min (C.) | Skin-to-skin time with mother | Admission temp (C.) |
|---|---|---|---|---|---|---|---|---|---|---|---|
| 12 | 38-40 | C/S-V | yes | 9-9 | 6 | No read | none | 67.1 | 36 | 8 min | 35.9 |
| 13 | 38-40 | C/S-V | yes | 9-9 | 4 | 96 | none | 66.9 | 35.7 | 10 min | 36.6 |
| 14 | 38-40 | C/S-V | yes | 9-9 | 3 | 91 | none | 67.6 | 36 | 10 min | 36.5 |
| 15 | 38-40 | C/S-V | yes | 9-9 | 3 | 95 | none | 66.8 | 35.7 | No docu | 35.7 |
| 16 | 38-40 | C/S-B | yes | 9-9 | 4 | 87 | none | 67.1 | 36.5 | 5 min | 36.6 |
| 17 | 35-37 | C/S-V | yes | 8-9 | 4 | 95 | none | 67.7 | 35.6 | 5 min | 36.7 |
| 18 | 38-40 | Stat C/S | yes | 9-9 | 3 | 99 | none | 67.8 | 36.7 | 5 min | 37.2 |
| 19 | 38-40 | C/S-V | yes | 8-8 | 7 | 73 | none | 67.3 | 36.7 | 3 min | 36.4 |
| 20 | 38-40 | C/S-V | yes | 9-9 | 4 | 92 | Blow By O2 | 66.7 | 35.7 | 10 min | 36.3 |
| 21 | 41+ | Emergent C/S | yes | 9-9 | 3 | 93 | none | 66.8 | 36.2 | No docu | 37.1 |
| 22 | 38-40 | Emergent C/S | yes | 8-8 | 6 | 70 | none | 68.2 | 36.6 | No docu | 37.6 |
| 23 | 38-40 | Vaginal | yes | 7-9 | 2 | 99 | PPV/CPAP | 71 | 38 | No docu | 37.9 |
| 24 | 38-40 | C/S-V | yes | 8-8 | 7 | 70 | none | 66.6 | 35 | No docu | 35.8 |
| 25 | 38-40 | Emergent C/S | yes | 6-7 | 6 | 78 | PPV/CPAP | 67 | 33.5 | yes | 35.6 |
| 26 | 38-40 | C/S-B | yes | 8-9 | 3 | 94 | PPV | 67.4 | 36.4 | yes | 36.8 |
| 27 | 38-40 | C/S-vacuum | yes | 8-9 | 2 | 93 | none | 66.8 | 36.6 | yes | 36.8 |
| 28 | 38-40 | C/S-V | yes | 8-9 | 3 | 92 | none | 66.2 | 36.8 | yes | 36.7 |
| 29 | 35-37 | Twin C/S | yes | 8-9 | 2 | 96 | none | 67.5 | 37.1 | yes | 36.9 |
| 30 | 35-37 | Twin C/S | yes | 9-9 | 1 | 98 | none | 67.5 | 37.1 | yes | 36.9 |
| 31 | <26 | Urgent C/S | yes | 7-9-9 | 1 | 95 | PPV + O2 | 66.8 | . . . | no | 36.3 |

Notes for Table 2. Gestational age is weeks and 0/7 to weeks and 6/7 (i.e. 38 0/7 weeks to 40 6/7 weeks). Presentation is indicated by B = breech or V = vertex. Min = minutes. F. = Fahrenheit. C. = Celsius. No docu = No documentation. Yes = occurred for undocumented amount of time.

Conclusions

It is feasible to provide warmth to newborns greater than 35 weeks gestational age and elicit timely effective ventilation during at least 60 second delayed cord clamping using a resuscitation equipped commercial infant warmer equipped with a mattress support extension tray. Improvement in admission temperatures is encouraging. Workflow changes have been smooth with pre-briefing. Even the use of step stools to accommodate height differences of obstetric providers have been navigated without issue. Sterile field integrity can be preserved.

Provider feedback has noted strong support for moving from simulations to controlled deliveries to build provider confidence. Unanticipated benefits have been family-centered such as skin-to-skin contact in the OR becoming an expectation and as a result of clamping the cord closer to the mother and dropping it onto the warmer as a means of protecting the sterile field, fathers have been invited to come to the CIW to shorten the umbilical cord after C-sections. Using the warmer scale is also becoming an integrated facet of initial care in the OR.

The extending apparatus of the present invention and the associated protocol has the potential to become standard practice and be integrated into care delivery models at other birthing hospitals.

Example 2: Use of the Extending Apparatus in a Delivery Room or Operating Room

The extending apparatus of the present invention is used for a variety of delivery situations, which can include, among others: full term vaginal deliveries, full-term high-risk vaginal deliveries, pre-term vaginal deliveries, full-term C-sections, pre-term C-sections, and multiple birth situations such as twins. The set up and use of the apparatus in conjunction with a commercial infant warmer is illustrated for a pre-term vaginal delivery. The set up and use is readily modified for other delivery situations.

The following detailed guidelines combine aspects of the workflow pathway and protocols exemplified in FIGS. 1B and 2.

Best START with Delayed Cord Clamping Process Guideline—Preterm Vaginal Deliveries Warmer 5 will be pre-set at counter height. unit care technician will have verified mattress tray 1 and support guides 2 present Warmer 5 is turned on and heat increased to 100% at time of calling for NICU attendance PA will flip on gases & suction switches, verify PPV pressures, blender at 21%, suction 80-100 mm/Hg, and pick up edge of mattress 3 to verify presence of mattress tray 1 and right and left support guides 2.

Baby nurse will be sure pulse ox probe and posy wrap, hat, and temp probe are on warmer 5, and that brakes are off. She will stand on supply cabinet side of warmer 5 to start the APGAR timer.

PA will extend mattress tray 1 to approximately 9 inches using footwall as a guide.

If <32 wks., PA will activate chemical mattress (i.e. a variant of the mattress 3) and place on the extended mattress tray 1. PA will give or direct NICU RN to give thermobag to OB maintaining sterile integrity.

For all gestational ages, PA will stand near foot of warmer 5 to observe delivery for status of fluid/mec, presentation, nuchal cord, tone, color, etc.

OB will place baby on mother's abdomen in prone position. If <32 wks. OB will place baby in thermobag before or as soon as placed on mother's abdomen.

PA will bring warm hat and towel to bedside to dry and stimulate on mom×20 sec if >32 wks.

If crying ensues, evaluate and score Apgar's while infant is skin-to-skin

If no or poor respiratory effort and/or <32 wks, PA will ask baby nurse to bring warmer 5 to bedside, ask OB resident to lower mother's leg to straight position, may ask L&D nurse to lower mother's bed, and will tell family members to stay in their places until the warmer 5 returns to its original position.

The warmer 5 will be perpendicular (T-shaped) to mother against her bed. PA will remove newborn from mother and place supine on warmer mattress 3 (or on chemical mattress if <32 wks., Thermobag should cover head like a hoodie & hat over top) with head on PA side and feet at baby nurse side.

If this movement and temperature change result in lusty cry as infant is placed on warmer mattress 3, infant can be returned to mother's abdomen and breath sounds/heart rate evaluated during skin-to-skin.

If no or poor respiratory effort and/or <32 wks., PA will begin PPV or CPAP as appropriate.

Baby nurse will place pulse ox probe on right wrist (or hand if large baby—light dot has to shine directly through to sensor dot) and wrap with posey. If <32 wks. put temp probe in axilla and arm down. Listen & report air entry quality & HR> or <100 bpm. If >32 wks. ax temp at 5 min.

If poor chest rise/air entry, PA will proceed through steps of MR. SOPA (may request $CO_2$ detector to help with evaluation). At max 90 sec intubation should begin (either by summoned neonatologist or by PA. Initially, less experienced PA may elect to have cord clamped & cut to return warmer to wall prior to intubation if neonatologist is not yet present.). $O_2$ will be adjusted in accordance with $SpO_2$ target timeline.

Ideally, infant will demonstrate effective ventilation×30 sec with good chest rise prior to clamping and cutting cord.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the apparatus and methods of the present invention, where the term comprises is used with respect to the recited steps of the methods or components of the apparatus, it is also contemplated that the methods and components of the apparatus consist essentially of, or consist of, the recited steps or components. Furthermore, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances a composition can be described as being composed of the components prior to mixing, because upon mixing certain components can further react or be transformed into additional materials.

All percentages and ratios used herein, unless otherwise indicated, are by weight.

What is claimed is:

1. An extending apparatus for providing safe and effective access for a newborn infant to a neonatal warming device while an umbilical cord is still intact comprising:

a movable infant support assembly comprising an infant support tray and two longitudinal support guides oriented parallel to each other, wherein the longitudinal support guides are tubular and each comprise a longitudinal cut-away section, and wherein the infant support tray is moveable to extend beyond the front of the neonatal warming device.

2. The extending apparatus of claim 1, wherein the support tray is essentially rectangular and comprises a flat surface and from one to four essentially vertical sides.

3. The extending apparatus of claim 1, wherein the support tray is essentially rectangular and comprises a flat surface and three essentially vertical sides.

4. The extending apparatus of claim 1, wherein the support tray comprises a handle, a groove, an opening, or a vertical side for grasping the support tray.

5. The extending apparatus of claim 4, wherein the support tray comprises an opening for grasping the support tray.

6. The extending apparatus of claim 1, wherein the support tray comprises a stop for preventing overextension of the support tray.

7. The extending apparatus of claim 1, wherein the longitudinal support guides engage the support tray.

8. The extending apparatus of claim 1, wherein the longitudinal support guides movably engage the support tray.

9. The extending apparatus of claim 1, wherein the longitudinal support guides further engage the neonatal warming device.

10. The extending apparatus of claim 1, wherein the longitudinal support guides each define a hollow four-sided rectangular cross-section and each guide comprises a longitudinal cut-away section on a face of one of the rectangular sides of the respective guide.

11. The extending apparatus of claim 10, wherein the longitudinal support guides engage the support tray.

12. The extending apparatus of claim 10, wherein the longitudinal support guides movably engage the support tray.

13. The extending apparatus of claim 10, wherein the longitudinal support guides further engage the neonatal warming device.

14. The extending apparatus of claim 10 further comprising a scale engageable with the longitudinal support guides.

15. A method for providing safe and effective access for the newborn infant to the neonatal warming device while the umbilical cord is still intact comprising utilizing the extending apparatus of claim 1.

16. A method for providing safe and effective access for the newborn infant to the neonatal warming device to allow for delayed cord clamping (DCC) of the umbilical cord attached to the infant and mother comprising utilizing the extending apparatus of claim 1.

17. The extending apparatus of claim 1 further comprising a scale engageable with the longitudinal support guides.

18. A neonatal warming device comprising an extending apparatus for providing safe and effective access for a newborn infant to a neonatal warming device while an umbilical cord is still intact comprising:

- a movable infant support assembly comprising an infant support tray and two longitudinal support guides oriented parallel to each other,
- wherein the longitudinal support guides are tubular and each comprise a longitudinal cut-away section, and
- wherein the infant support tray is moveable to extend beyond the front of the neonatal warming device.

19. A method for providing safe and effective access for the newborn infant to the neonatal warming device while the umbilical cord is still intact comprising utilizing the device of claim 18.

20. A method for providing safe and effective access for the newborn infant to the neonatal warming device to allow for delayed cord clamping (DCC) of the umbilical cord attached to the infant and mother comprising utilizing the device of claim 18.

21. The neonatal warming device of claim 18, wherein said extending apparatus further comprises a scale engageable with the longitudinal support guides.

* * * * *